(12) United States Patent
Sun

(10) Patent No.: US 11,145,038 B2
(45) Date of Patent: Oct. 12, 2021

(54) IMAGE PROCESSING METHOD AND DEVICE FOR ADJUSTING SATURATION BASED ON DEPTH OF FIELD INFORMATION

(71) Applicant: Guangdong Oppo Mobile Telecommunications Corp., Ltd., Guangdong (CN)

(72) Inventor: Jianbo Sun, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 69 days.

(21) Appl. No.: 16/561,825

(22) Filed: Sep. 5, 2019

(65) Prior Publication Data

US 2019/0392560 A1    Dec. 26, 2019

Related U.S. Application Data

(63) Continuation of application No. PCT/CN2018/078054, filed on Mar. 5, 2018.

(30) Foreign Application Priority Data

Mar. 9, 2017   (CN) .......................... 201710138682.6

(51) Int. Cl.
*G06T 5/00* (2006.01)
*G06T 7/00* (2017.01)
(Continued)

(52) U.S. Cl.
CPC .......... *G06T 5/008* (2013.01); *G06K 9/00241* (2013.01); *G06K 9/00255* (2013.01);
(Continued)

(58) Field of Classification Search
CPC .......... G06T 5/008; G06T 5/50; G06T 7/194; G06T 7/593; G06T 2207/10012;
(Continued)

(56) References Cited

U.S. PATENT DOCUMENTS

2011/0150321 A1   6/2011   Cheong et al.
2013/0148853 A1*  6/2013   Hwang .............. G06K 9/00268
                                                      382/103
(Continued)

FOREIGN PATENT DOCUMENTS

CN    101277372 A      10/2008
CN    103871014 A  *   6/2014
(Continued)

OTHER PUBLICATIONS

Skin-Sensitive Automatic Color Correction.
(Continued)

*Primary Examiner* — John B Strege
*Assistant Examiner* — Claude Noel Y Zanetsie
(74) *Attorney, Agent, or Firm* — Young Basile Hanlon & MacFarlane, P.C.

(57) ABSTRACT

A method and a device for processing an image saturation based on depth of field, an electronic device and a computer readable storage medium are provided, for processing scene data collected by an imaging device. The scene data includes a first scene image. The method includes the following. The scene data is processed to determine whether a portrait exists in a scene. In response to determining that the portrait exists, the scene data is processed to identify a portrait region. The first scene image is processed to reduce a saturation of the portrait region.

18 Claims, 17 Drawing Sheets

(51) Int. Cl.
   *G06T 7/194*   (2017.01)
   *G06T 7/593*   (2017.01)
   *G06K 9/00*    (2006.01)
   *G06T 5/50*    (2006.01)
(52) U.S. Cl.
   CPC .............. *G06T 5/50* (2013.01); *G06T 7/194* (2017.01); *G06T 7/593* (2017.01)
(58) Field of Classification Search
   CPC ........... G06T 2207/30201; G06T 2207/10024; G06K 9/00241; G06K 9/00255; G06K 9/00228; G06K 9/00362; G06K 9/00275
   See application file for complete search history.

(56) References Cited

U.S. PATENT DOCUMENTS

| | | | |
|---|---|---|---|
| 2014/0362188 | A1 | 12/2014 | Yokokawa et al. |
| 2017/0163953 | A1* | 6/2017 | Wang ................. H04N 5/23219 |
| 2018/0077395 | A1* | 3/2018 | Kitajima ................ H04N 5/235 |
| 2019/0392564 | A1* | 12/2019 | Sun ......................... G06T 5/009 |

FOREIGN PATENT DOCUMENTS

| | | | |
|---|---|---|---|
| CN | 103871014 | A | 6/2014 |
| CN | 104333748 | A | 2/2015 |
| CN | 104994363 | A | 10/2015 |
| CN | 105608677 | A | 5/2016 |
| CN | 106101547 | A | 11/2016 |
| CN | 106937049 | A | 7/2017 |
| CN | 107025635 | A | 8/2017 |
| JP | 2001136546 | A | 5/2001 |

OTHER PUBLICATIONS

European Search Report dated Jan. 28, 2020 from International Application No. PCT/CN2018/078054.
Hila Navhlieli et al.; Skin-Sensitive Automoatic Color Correction; HP Laboratories; HPL-2009-13; pp. 1-14.
Extended European Search Report for European Application No. 18764203.8 dated Jan. 28, 2020.
International Search Report with English Translation for PCT/CN2018/078054, dated May 22, 2018.
Office Action with English Translation for CN application 201710138682.6, dated May 24, 2019.
India Office Action for Application No. 201917037401 dated Mar. 19, 2021.
Communication pursuant to Article 94(3) EPC for EP Application 18764203.8 dated Apr. 4, 2021.

* cited by examiner

IMAGE PROCESSING METHOD AND DEVICE FOR ADJUSTING SATURATION BASED ON DEPTH OF FIELD INFORMATION

CROSS-REFERENCE TO RELATED APPLICATION(S)

This application is a continuation of International Application No. PCT/CN2018/078054, filed on Mar. 5, 2018, which is based on and claims priority to Chinese Patent Application No. 201710138682.6, filed on Mar. 9, 2017, the contents of both of which are incorporated herein by reference in their entireties.

TECHNICAL FIELD

The present disclosure relates to a field of imaging technologies, and more particular to a method and a device for processing an image saturation based on a depth of field, an electronic device and a computer readable storage medium.

BACKGROUND

Generally, an image saturation may be adjusted. Therefore, the image may have a good color representation. High saturation of the image may cause skin color of a portrait that is yellowish with a poor vision effect.

SUMMARY

Embodiments of the present disclosure provide a method for processing an image saturation based on depth of field, an electronic device and a computer readable storage medium.

The method for processing an image saturation based on depth of field is provided to process scene data collected by an imaging device. The scene data includes a first scene image. The method may include:

processing the scene data to determine whether a portrait exists in a scene;

in response to determining that the portrait exists, processing the scene data to identify a portrait region; and processing the first scene image to reduce a saturation of the portrait region.

An electronic device, including a processor and a memory. The memory has an executable program code stored thereon. The processor, by reading the executable program code stored in the memory, may be configured to execute the method for processing an image saturation based on depth of field.

A computer readable storage medium is provided, having instruction stored thereon. When the instructions are executed by a processor of an electronic device, the electronic device is configured to execute the method for processing an image saturation based on depth of field.

Additional aspects and advantages of the present disclosure will be provided in description below. A part of the present disclosure will become apparent, or may be practiced from the present disclosure.

BRIEF DESCRIPTION OF DRAWINGS

The above and/or additional aspects and advantages of the present disclosure may become apparent and readily to be understood from descriptions made to embodiments in combination with drawings, in which.

DETAILED DESCRIPTION

Generally, an image saturation may be adjusted entirely. When a portrait exists in an image, processing on the saturation of a portrait part may be inappropriate, thereby making effect poor.

Therefore, embodiments of the present disclosure provide a method and a device for processing an image saturation based on depth of field, an electronic device and a computer readable storage medium.

Figure 1:
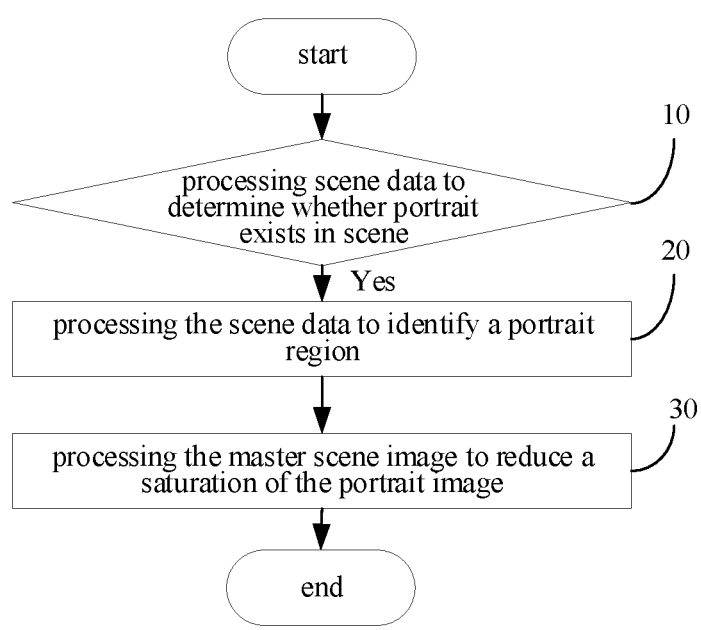
FIG. 1 is a flowchart illustrating a processing method according to implementations of the present disclosure.

As illustrated in FIG. 1, a method for processing an image saturation based on depth of field according to implementations of the present disclosure is provided, configured to process scene data collected by an imaging device. The scene data includes a first scene image. The method may include the following.

At block 10, the scene data is processed to determine whether a portrait exists in a scene.

At block 20, in response to determining that the portrait exists, the scene data is processed to identify a portrait region.

At block 30, the first scene image is processed to reduce a saturation of the portrait region.

Figure 2:
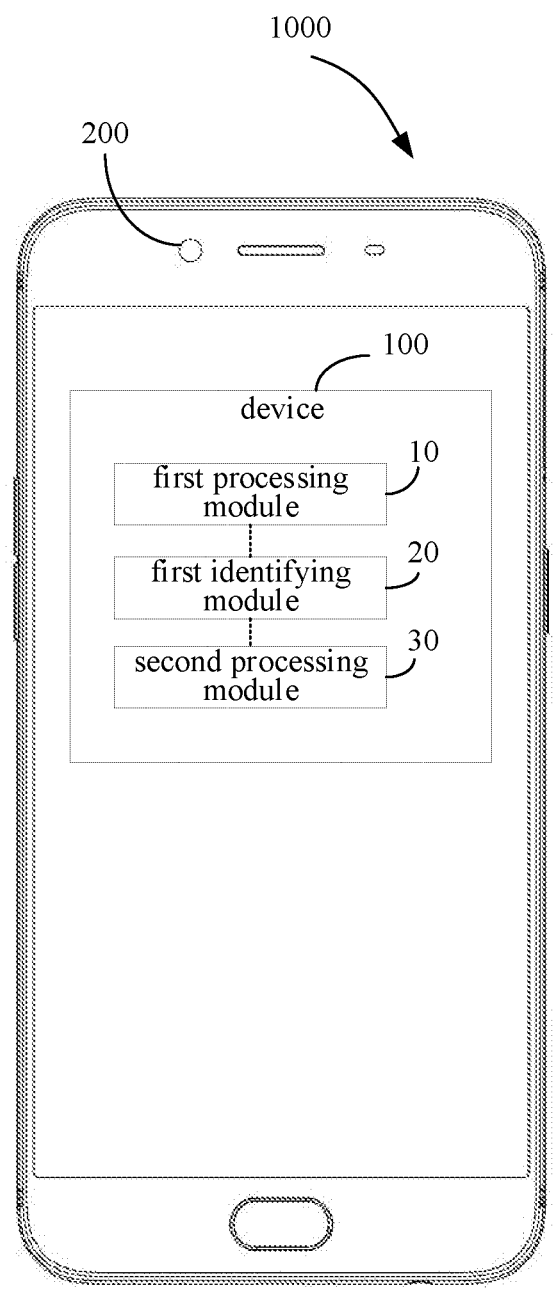
FIG. 2 is a block diagram illustrating functional modules of a processing device according to implementations of the present disclosure.

As illustrated in FIG. 2, a device 100 for processing an image saturation based on depth of field according to implementations of the present disclosure may include a first processing module 10, a first identifying module 20 and a second processing module 30. As an example, the method for processing an image saturation according to implementations of the present disclosure may be implemented by the device 100 according to implementations of the present disclosure.

The block 10 of the method according to implementations of the present disclosure may be implemented by the first processing module 10. The block 20 may be implemented by first identifying module 20. The block 30 may be implemented by the second determining module 30.

In other words, the first processing module 10 may be configured to process the scene data to determine whether a portrait exists in the scene. The first identifying module 20 may be configured to, in response to determining that the portrait exists, process the scene data to identify a portrait region. The second processing module 30 may be configured to process the first scene image to reduce the saturation of the portrait region.

The device 100 according to implementations of the present disclosure may be integrated in an electronic device 1000 according to implementations of the present disclosure. That is, the electronic device 1000 according to implementations of the present disclosure may include the device 100 according to implementations of the present disclosure. Certainly, the electronic device 1000 according to implementations of the present disclosure may include an imaging device 200. The device 1000 may be electrically coupled to the imaging device 200. The imaging device 200 may be a front camera or a rear camera of the electronic device 1000.

Generally, it may be necessary to process color of an image after the image is captured, such as adjusting the saturation, such that the image may have a good vision effect. Generally, the saturation of the image is high such that the image may have bright colors. However, when the portrait exists in the image, the high saturation of the image may cause that skin color of the portrait is yellowish with a poor vision effect. However, the portrait region is generally a main object of interest by the user.

With the method for processing an image saturation based on the depth of field according to implementations of the present disclosure, it is identified whether the portrait exists in a scene image. In response to determining that the portrait exists, the portrait region is determined and processed with the saturation processing separately. In detail, the saturation of the portrait region is reduced to maintain skin color of the portrait region, thereby preventing the skin color from being yellowish resulted from a high saturation of the image. That is, the portrait region is identified and is processed with the saturation processing separately.

With the method and the device 100 for processing an image saturation and the electronic device 1000 according to implementations of the present disclosure, the portrait region may be determined when the portrait region exists in the scene image. The saturation of the portrait region may be reduced. By separately processing the saturation of the portrait region to reduce the saturation of the portrait region, color representation of the portrait region may be good and a display effect of the image may be good.

In some implementations, the electronic device 1000 may include a phone, a tablet computer, a smart wristband, a smart helmet, a smart glass, which is not limited in the present disclosure. In specific implementations of the present disclosure, the electronic device 1000 may be a phone.

It may be understood that, the phone is usually used to capture an image. With the image for processing an image saturation according to implementations of the present disclosure, the saturation of the image may be processed such that the image may have a good vision effect, thereby improving user experience.

Figure 3:
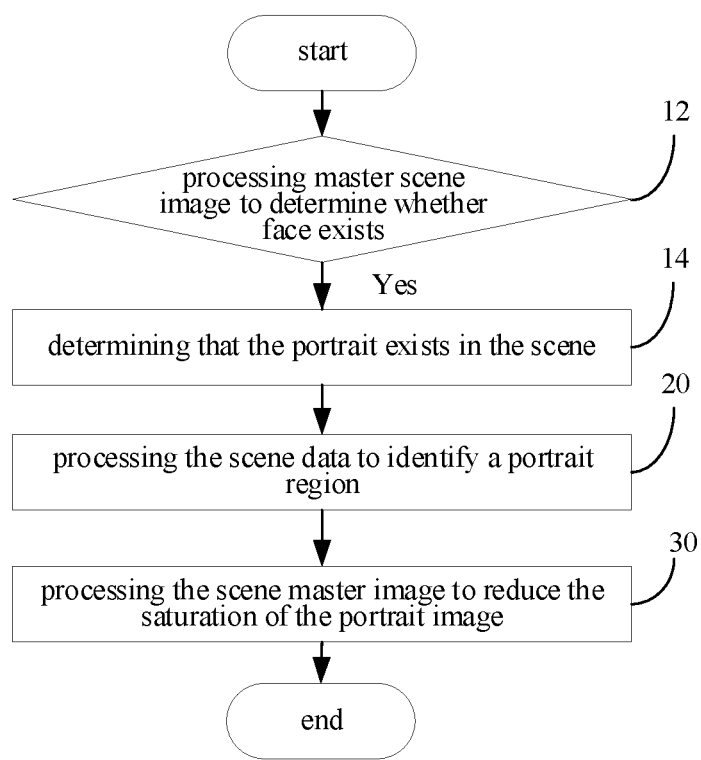
FIG. 3 is a flowchart illustrating a processing method according to implementations of the present disclosure.

As illustrated in FIG. 3, in some implementations, the block 10 may include the following.

At block 12, the first scene image is processed to determine whether a face exists.

Figure 6:
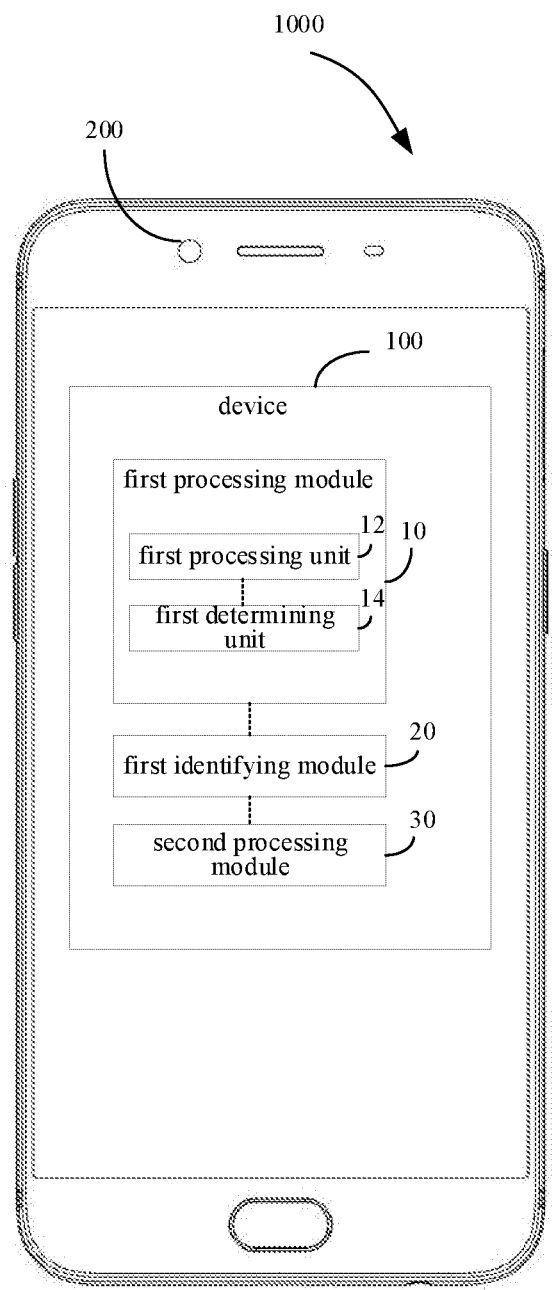
FIG. 6 is a block diagram illustrating functional modules of a processing device according to implementations of the present disclosure.

At block 14, in response to determine that the face exists, it is determined that the portrait exists in the scene As illustrated in FIG. 6, in some implementations, the first processing module 10 may include a first processing unit 12 and a first determining unit 14. The block 12 may be implemented by the first processing unit 12. The block 14 may be implemented by the first determining unit 14. In other words, the first processing unit 12 may be configured to process the scene data to determine whether a face exists. The first determining unit 14 may be configured to determine the portrait exists in the scene, in response to determining that the face exists.

In detail, the face may be detected based on a preset face template or a preset color. In response to determining that the face exists in the scene, a part adjacent to the face may be determined as the portrait region. Specific implementations are not limited in the present disclosure. For example, the portrait may be determined by matching to a portrait template. Therefore, by determining whether the face exists, the face may be further determined, such that the saturation processing may be separately performed on the portrait region.

Figure 5:
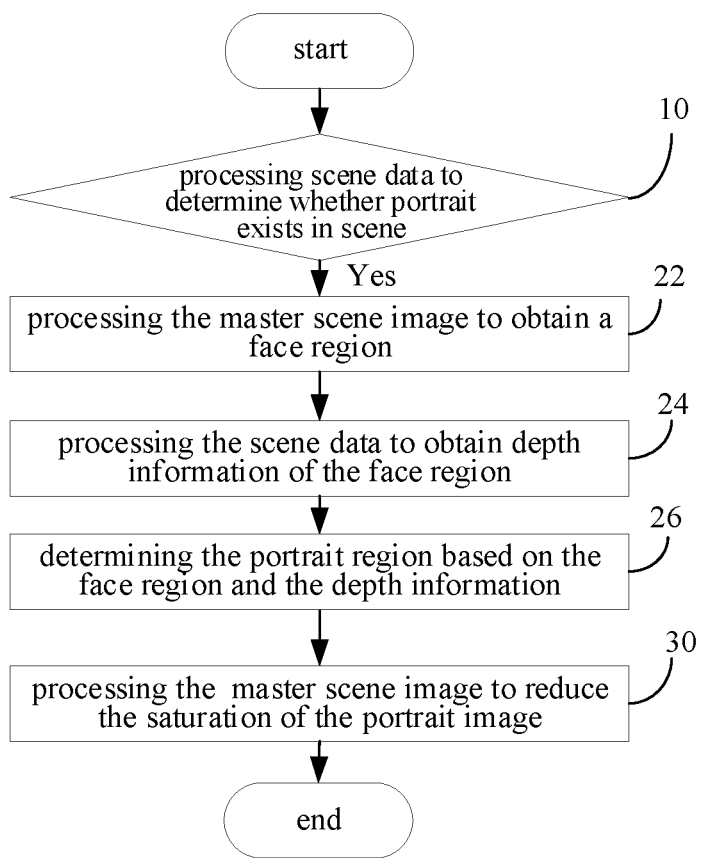
FIG. 5 is a flowchart illustrating a processing method according to implementations of the present disclosure.

As illustrated in FIG. 5, in some implementations, the block 20 may include the following.

At block 22, the first scene image is processed to obtain a face region.

At block 24, the scene data is processed to obtain depth information of the face region.

At block 26, the portrait region is determined based on the face region and the depth information.

Figure 4:
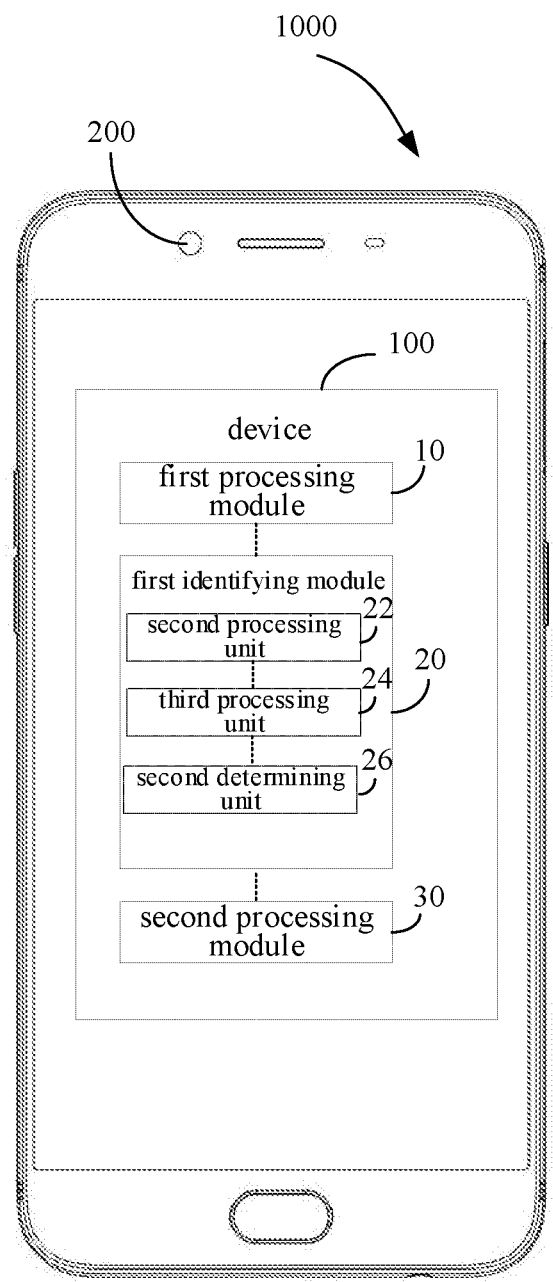
FIG. 4 is a block diagram illustrating functional modules of a processing device according to implementations of the present disclosure.

As illustrated in FIG. 4, in some implementations, the first identifying module 20 may include a second processing unit 22, a third processing unit 24 and a second determining unit 26. The block 22 may be implemented by the second processing unit 22. The block 24 may be implemented by the third processing unit 24. The block 26 may be implemented by the second determining unit 26. In other words, the second processing unit 22 may be configured to process the first scene image to obtain a face region. The third processing unit 24 may be configured to process scene data to obtain depth information of the face region. The second determining unit may be configured to determine the portrait region based on the face region and the depth information.

It may be understood that, the scene data may be collected by the imaging device 200. The scene data may include the depth information of a photographed scene. After the face is detected, the face region of the first scene image may be obtained. The portrait region contains the face region. That is, the depth information corresponding to the portrait region and the depth information corresponding to the face region are within a same depth range. Therefore, the portrait region may be determined based on the face region and the depth information of the face region. Since an acquisition of the depth information is not easily affected by factors such as light luminance and a color distribution of the scene, the acquisition of the portrait region based on the depth information may be accurate.

Figure 7:
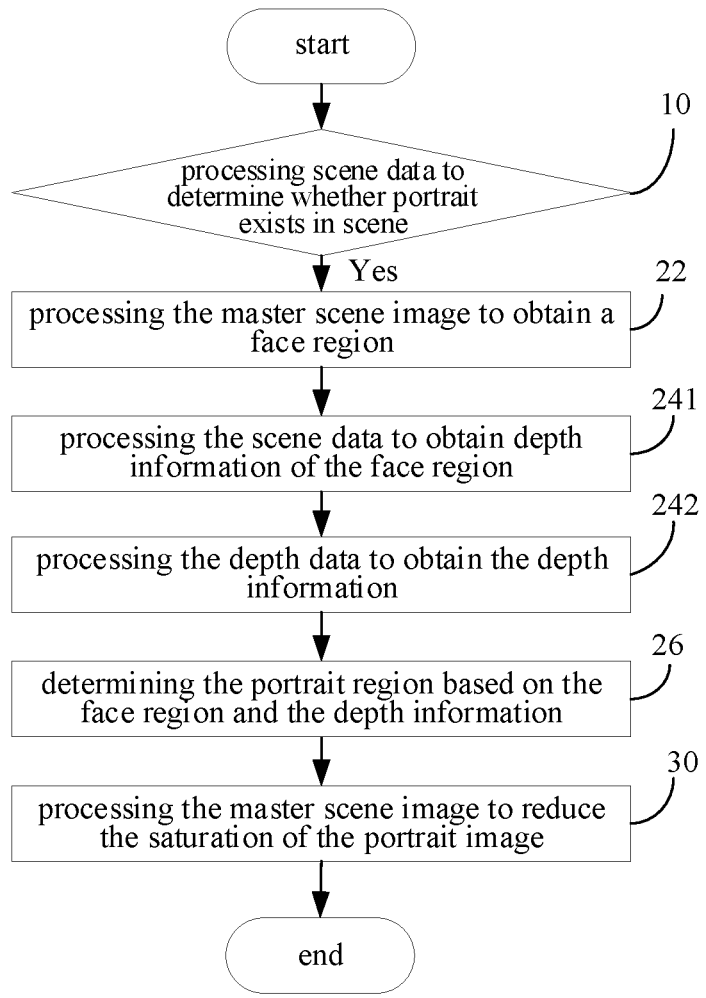
FIG. 7 is a flowchart illustrating a processing method according to implementations of the present disclosure.

As illustrated in FIG. 7, in some implementations, the scene data may include a depth map corresponding to the first scene image. The block 24 may include the following.

At block 241, the depth map is processed to obtain depth data of the face region.

At block 242, the depth data is processed to obtain depth information.

Figure 8:
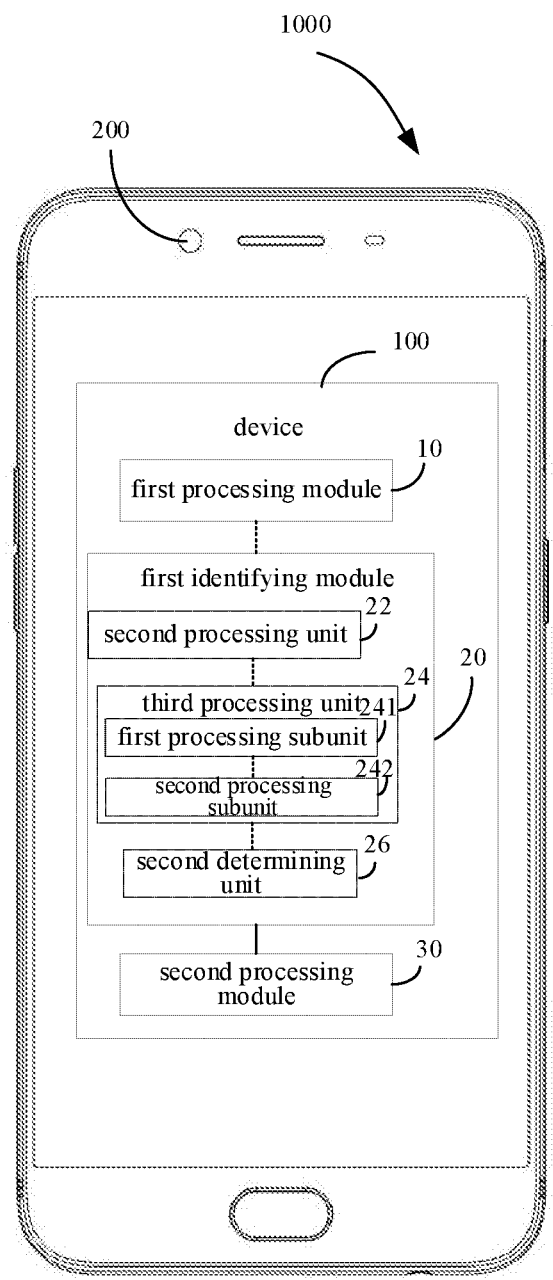
FIG. 8 is a block diagram illustrating functional modules of a processing device according to implementations of the present disclosure.

As illustrated in FIG. 8, in some implementations, the scene data may include a depth map corresponding to the first scene image. The third processing unit 24 may include a first processing subunit 241 and a second processing subunit 242. The block 241 may be implemented by the first processing subunit 241. The block 242 may be implemented by the second processing subunit 242. In other words, the first processing subunit 241 may be configured to process the depth map to obtain the depth data of the face region. The second processing subunit 242 may be configured to process the depth data to obtain the depth information.

It may be understood that, the first scene image may be an RGB (Red-Green-Blue) image. The depth map may include depth information of various persons and objects. The color information of the first scene image may have a one-by-one relation to the depth information of the depth map. Therefore, when the face region is detected in the first scene image, the depth information of the face may be obtained from the corresponding depth map.

It should be noted that, in the first scene image, the face region may be represented of a two-dimensional image. Since the face contains features such as a nose, eyes, and ears, the depth data corresponding to the features, such as the nose, the eyes and the ears contained in the face region, is different from each other in the depth map. For example, when the face is faced to the imaging device 200, in the depth map captured, the depth data corresponding to the nose may be small while the depth data corresponding to the ears may be large. Therefore, in a specific implementation of the present disclosure, the depth information of the face region obtained by processing the depth data of the face region may be a single value or a value range. For example, when the face region is a single value, the value may be obtained by averaging the depth data of the face region, or may be obtained by taking a median of the depth data of the face region.

In some implementations, the method of acquiring the depth map corresponding to the first scene image may include a manner of obtaining the depth map via a method of depth measurement with structural light and a manner of obtaining the depth map by a time of flight (TOF) depth camera.

When the depth map is obtained with the method of depth measurement with structural light, the imaging device 200 may include a camera and a projector.

It may be understood that, the depth measurement with structural light is to use the projector to project the structural light having a certain pattern on a surface of the object, such that a three-dimensional stripe image modulated by the shape of the object may be formed on the surface. The three-dimensional stripe image may be detected by a camera to obtain a two-dimensional stripe distortion image. A distortion degree of stripes depends on a relative position between the light projector and the camera, and a surface profile and a surface height of the object. A displacement along the stripe may be proportional to the surface height of the object. A kink of the stripes may indicate a change of the surface. A discontinuity of the stripes may indicate a physical gap of the surface. When the relative position between the light projector and the camera is given, the three-dimensional profile of the object surface may be obtained from coordinates of the distorted two-dimensional stripe image. Therefore, the depth information may be obtained. The depth measurement with the structural light has a relatively high resolution and a relatively high measure accuracy.

When the depth map is obtained using the TOF depth camera, the imaging device 200 may include a TOF depth camera.

It may be understood that, the TOF depth camera may be configured to record, via a sensor, a change in phase of modulated infrared light emitted from a light emitter and a change in phase of infrared light reflected by the object. In a range of wavelengths, based on the light speed, a depth distance of the whole scene may be obtained in real time. Calculation of the depth information by the TOF depth camera may be not affected by a surface gray level and a surface feature of the object to be photographed. In addition, the depth information may be calculated quickly with high real-time performance.

Figure 9:
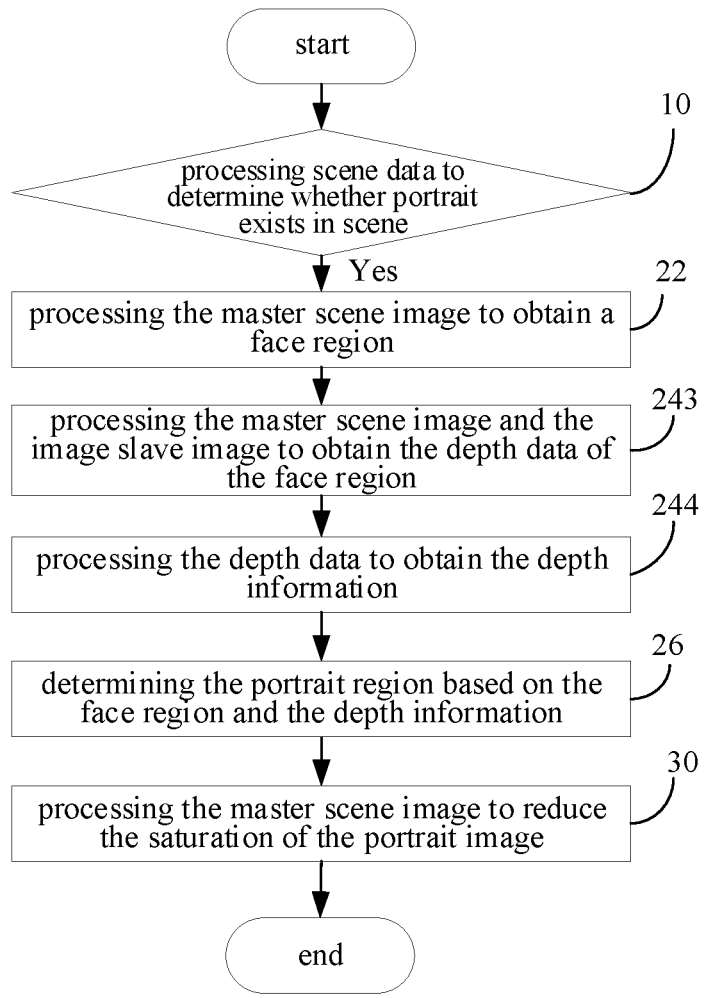
FIG. 9 is a flowchart illustrating a processing method according to implementations of the present disclosure.

As illustrated in FIG. 9, in some implementations, the scene data may include a second scene image corresponding to the first scene image. The block 24 may include the following.

At block 243, the first scene image and the second scene image are processed to obtain depth data of the face region.

At block 244, the depth data is processed to obtain depth information.

Figure 10:
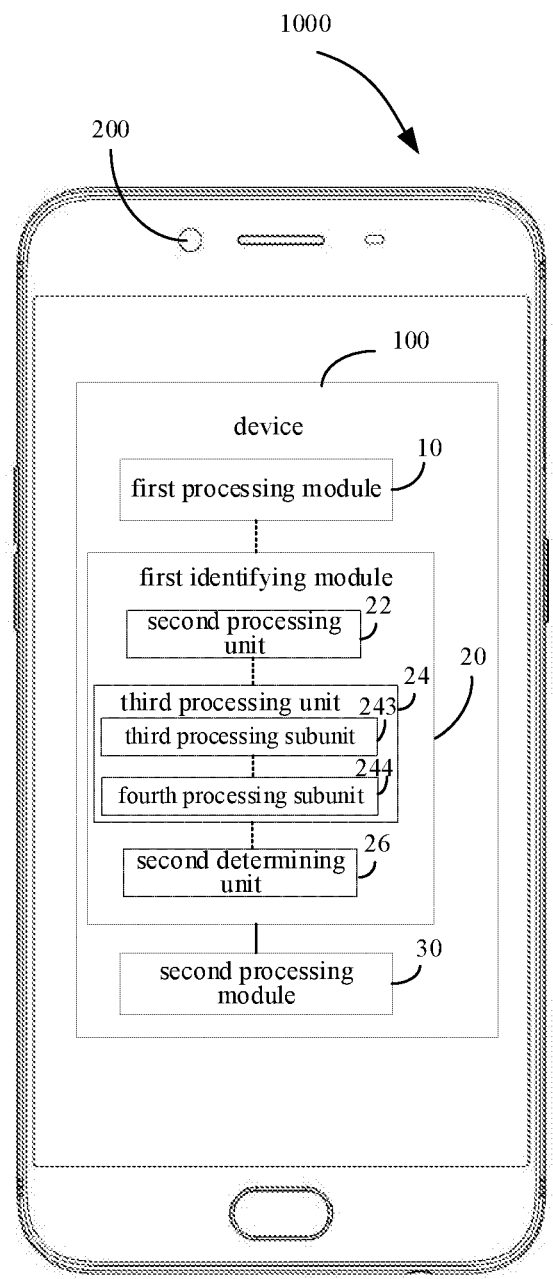
FIG. 10 is a block diagram illustrating functional modules of a processing device according to implementations of the present disclosure.

As illustrated in FIG. 10, in some implementations, the scene data may include the second scene image corresponding to the first scene image. The third processing unit 24 may include a third processing subunit 243 and a fourth processing subunit 244. The block 243 may be implemented by the third processing subunit 243. The block 244 may be implemented by the fourth processing subunit 244. In other words, the third processing subunit 243 may be configured to process the first scene image and the second scene image to obtain depth data of the face region. The fourth processing subunit 244 may be configured to process the depth data to obtain the depth information.

In some implementations, the imaging device 200 may include a first camera and a second camera.

It may be understood that, the depth information may be obtained by a binocular stereo vision distance measuring method. The scene data may include the first scene image and the second scene image. The first scene image may be obtained by the first camera. The second scene image may be obtained by the second camera. The binocular stereo vision distance measuring method is to employ two identical cameras at different positions to image an object to be photographed to obtain a stereo image of the object to be photographed. A disparity value may be calculated by matching corresponding image points of a pair of stereo images using an algorithm. Therefore, the depth information may be obtained through a triangulation method. The depth information of cached first image may be obtained by matching the pair of stereo images including the cached first image and the cached second image. The depth data of the face region may be processed to obtain the depth information of the face region. Since many features are contained in the face region and the depth data corresponding to each feature may be different from each other, the depth information of the face region may be obtained by averaging the depth data, or by taking a median of the depth data. In addition, the depth information of the face region may be a value range.

Figure 11:
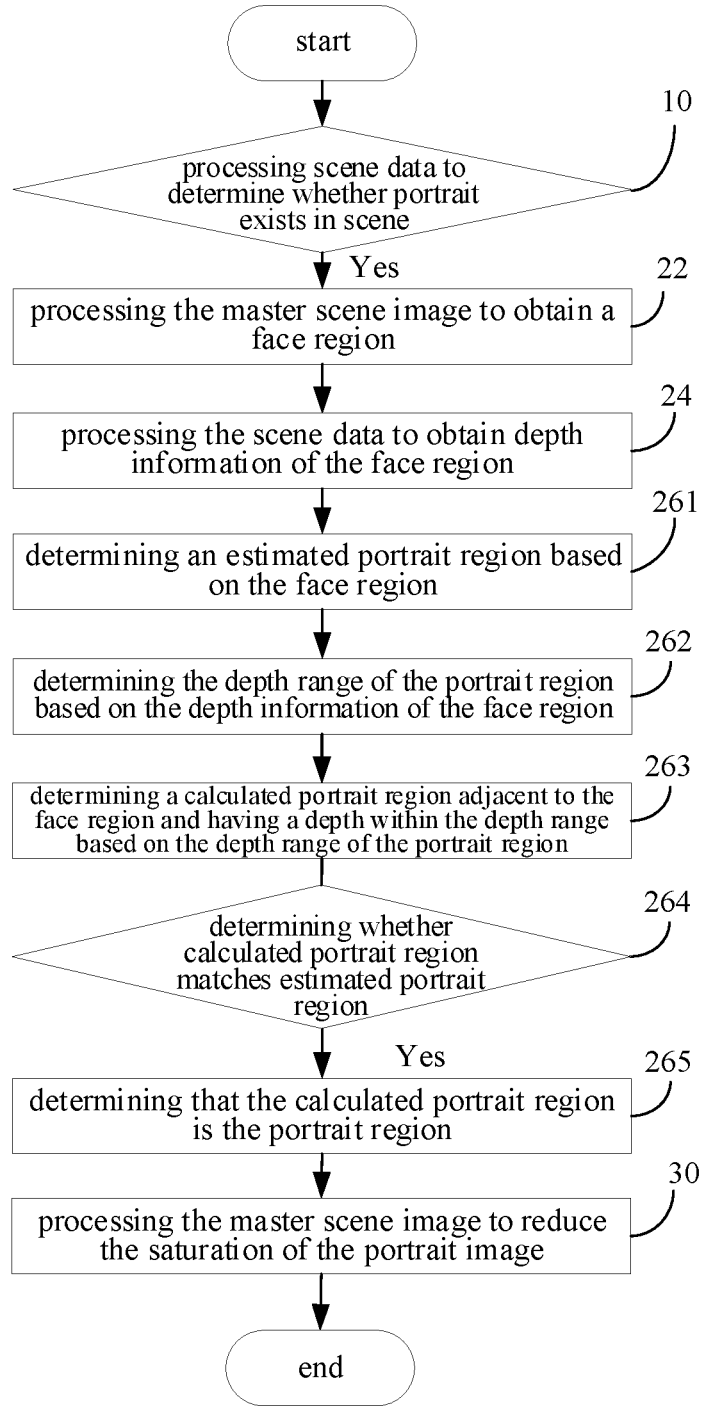
FIG. 11 is a flowchart illustrating a processing method according to implementations of the present disclosure.

As illustrated in FIG. 11, in some implementations, the block 26 may include the following.

At block 261, an estimated portrait region is determined based on the face region.

At block 262, a depth range of the portrait region is determined based on the depth information of the face region.

At block 263, a calculated portrait region adjacent to the face region and having a depth within a depth range is determined based on the depth range of the portrait region.

At block 264, it is determined whether the calculated portrait region matches the estimated portrait region.

At block 265, in response to determining that the calculated portrait region matches the estimated portrait region, it is determined that the calculated portrait region is the portrait region.

Figure 12:
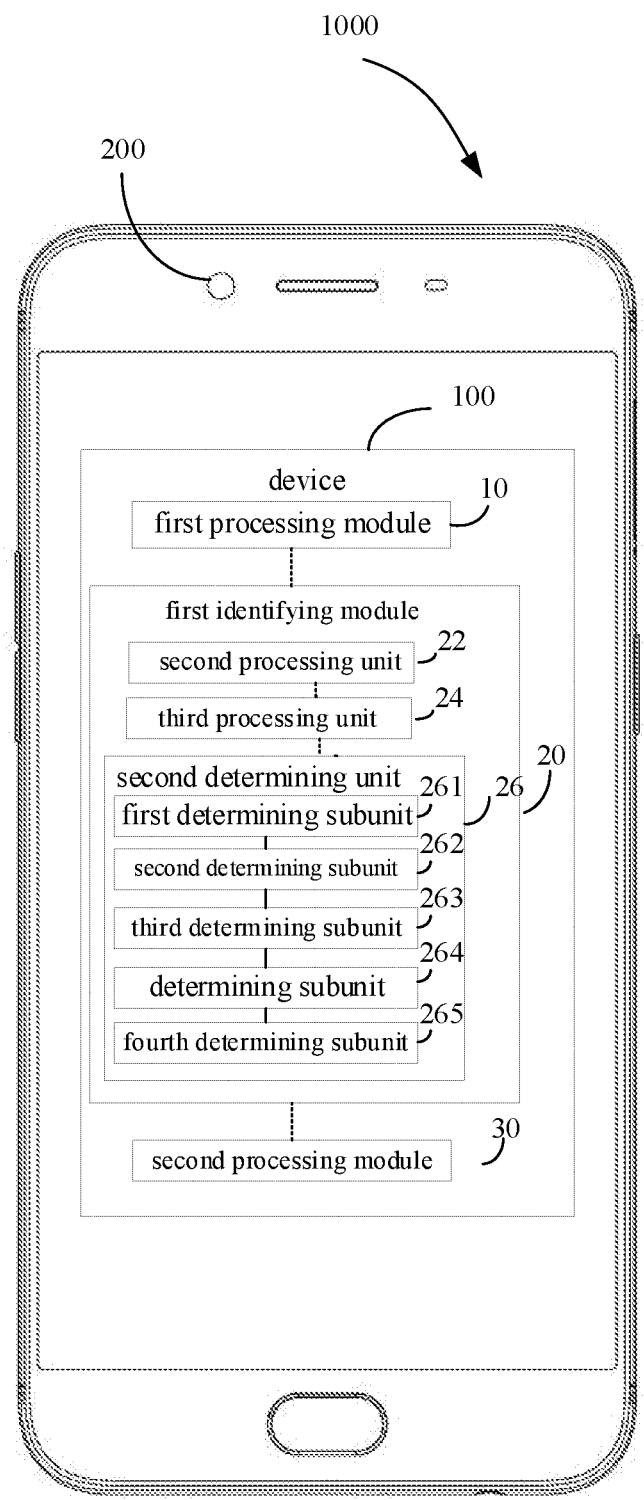
FIG. 12 is a block diagram illustrating functional modules of a processing device according to implementations of the present disclosure.

As illustrated in FIG. 12, in some implementations, the second determining unit 26 may include a first determining subunit 261, a second determining subunit 262, a third determining subunit 263, a determining subunit 264 and a fourth determining subunit 265. The block 261 may be implemented by the first determining subunit 261. The block 262 may be implemented by the second determining subunit 262. The block 263 may be implemented by the third determining subunit 263. The block 264 may be implemented by the determining subunit 264. The block 265 may be implemented by the fourth determining subunit 265. In other words, the first determining subunit 261 may be configured to determine an estimated portrait region based on the face region. The second determining subunit 262 may be configured to determine a depth range of the portrait region based on the depth information of the face region. The third determining subunit 263 may be configured to determine a calculated portrait region adjacent to the face region and having a depth within the depth range based on the depth range of the portrait region. The determining subunit 264 may be configured to determine whether the estimated portrait region matches the estimated portrait region. The further determining subunit 265 may be configured to determine that the calculated portrait region is the portrait region in response to determining that the calculated portrait region matches the estimated portrait region.

In detail, the portrait captured may correspond to various gestures, such as standing, squatting, facing the camera and laterally facing the camera. Therefore, after the face region is determined, the estimated portrait region may be determined based on a current status of the face region. The estimated portrait region refers to a matching sample library of the portrait region. The sample library may contain information of various gestures of the portrait. Since the portrait region contains the face region (that is, the portrait region and the face region have depths within a same depth range), after the depth information of the face region is determined, the depth range of the portrait region may be set based on the depth information of the face region. In addition, the calculated portrait region adjacent to the face region and having a depth within the depth range may be determined based on the depth range of the portrait region. Since a scene containing a person is complex when the portrait is photographed (that is, other objects may exist adjacent to the person), depths of these objects may be within the depth range of the portrait region. Therefore, after the calculated portrait region is determined, it may be necessary to match the calculated portrait region to the estimated portrait region. In case where the calculated portrait region is matched to the estimated portrait region, it may be determined that the calculated portrait region is the portrait region.

In some implementations, the block 20 may further include the following.

The first scene image is processed to obtain a color edge image, and an edge of the portrait region is rectified based on the color edge region.

In detail, the first scene image may be processed by an edge detection algorithm. The image data corresponding to the first scene image may be differentiated to obtain a set of pixels having a step change or a roof change in gray values. The edge detection algorithm may include Roberts operator, Sobel operator, Prewitt operator, Canny operator, Laplacian operation, LOG (Laplacian-of-Gaussian) operator and the like. In specific implementations of the present disclosure, the color edge image may be obtained via any one of the above edge detection algorithms, which is not limited in the present disclosure.

Figure 13:
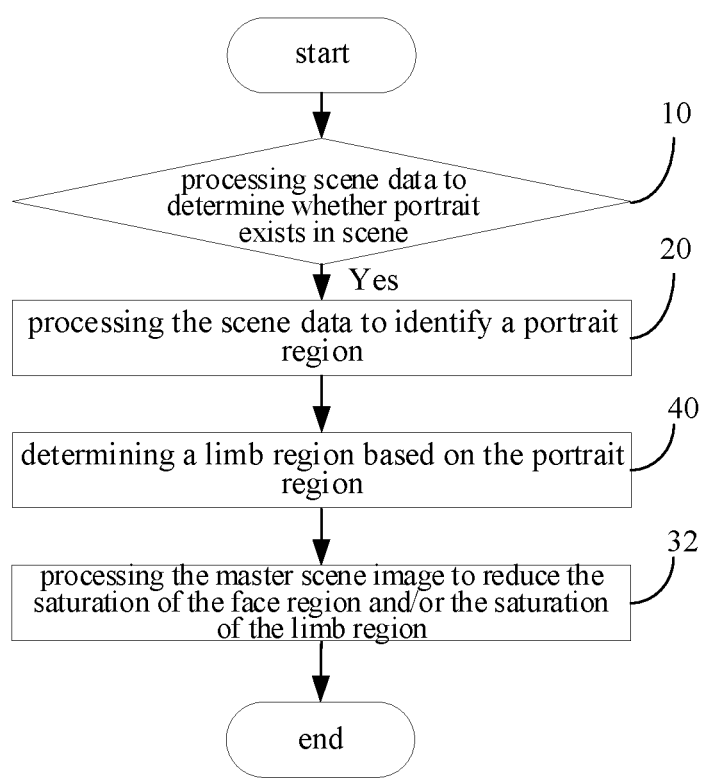
FIG. 13 is a flowchart illustrating a processing method according to implementations of the present disclosure.

As illustrated in FIG. 13, in some implementations, the method may further include the following.

At block 40, a limb region is determined based on the portrait region.

The block 30 may include the following.

At block 32, the first scene image is processed to reduce a saturation of the face region and/or a saturation of the limb region.

Figure 14:
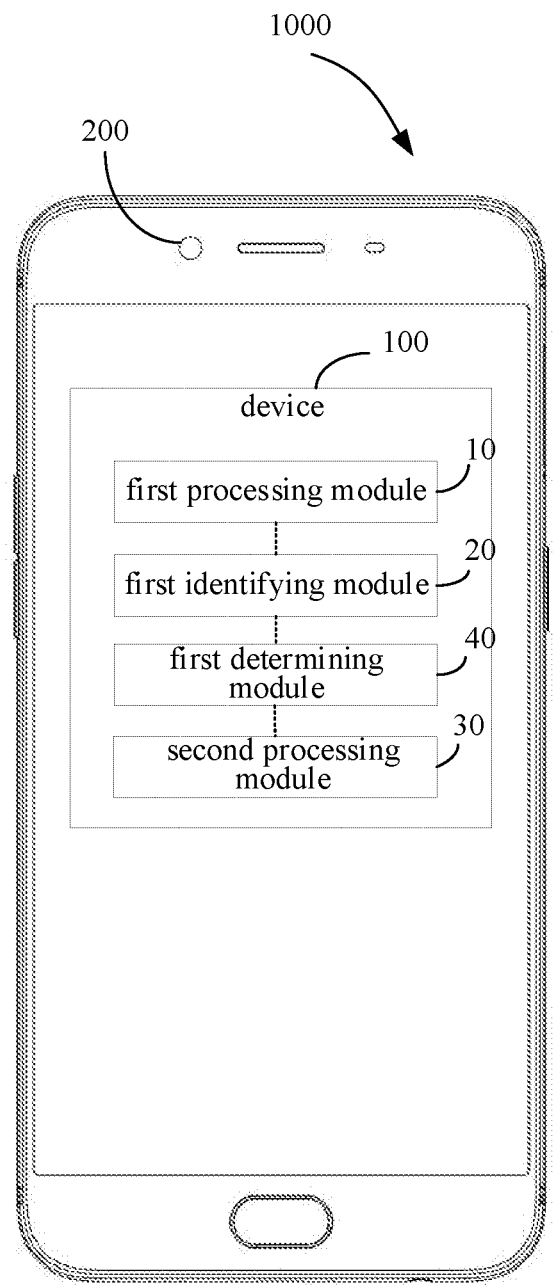
FIG. 14 is a block diagram illustrating functional modules of a processing device according to implementations of the present disclosure.

As illustrated in FIG. 14, in some implementations, the device 100 may further include a first determining module 40. The block S40 may be implemented by the first determining module 40. The block 32 may be implemented by the second processing module 30. In other words, the first determining module 40 may be configured to determine the limb region based on the portrait region. The second processing module 30 may be configured to process the first scene image to reduce the saturation of the face region and/or the saturation of the limb region.

In some implementations, the limb region may include a neck region, a hand region, a hip region, a leg region and/or a foot region. The color of the limb region may be similar to the color of the face region.

It may be understood that, the portrait region may also contain other limb regions. When the limb region is bare, it is required that the saturation processing performed on the limb region may be similar to that performed on the face region, i.e. reducing the saturation of the limb region such that the skin color is consistent for the portrait. In detail, the limb region may be determined by estimating a distribution of human skeleton (such as a distribution of limbs) based on the portrait region and the face region. In some examples, during the capturing, the determination of the limb region based on the distribution of human skeleton may have errors since clothes and gestures of the person are uncertain. Therefore, the limb region of the portrait may be determined by taking the color of the face region into account. The limb region and the face region may be processed with same saturation processing, such that the skin color of the limb region may be consistent to the face region.

Figure 15:
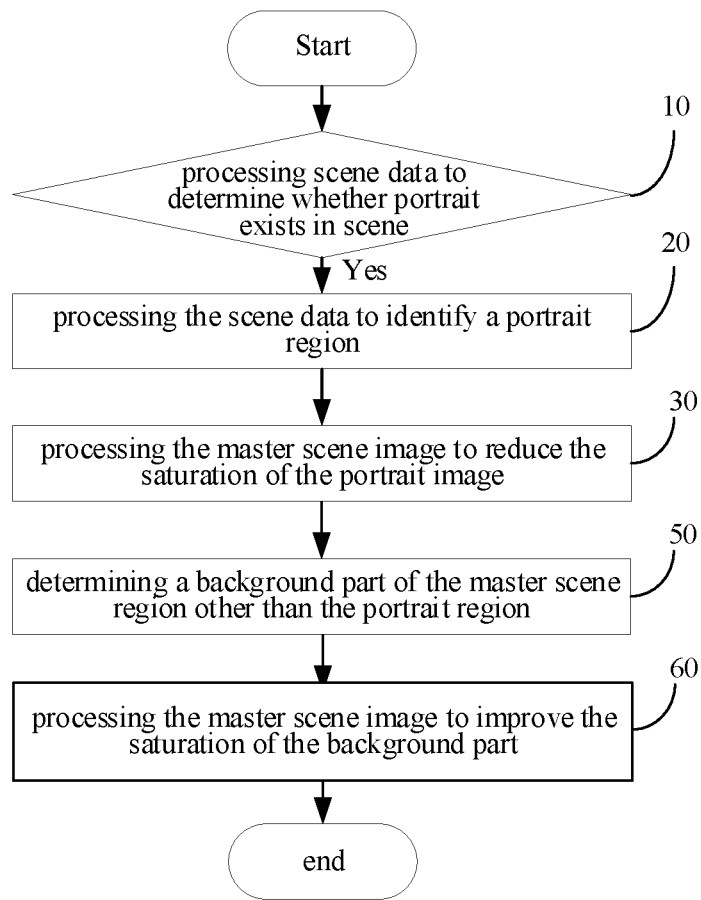
FIG. 15 is a flowchart illustrating a processing method according to implementations of the present disclosure.

As illustrated in FIG. 15, in some implementations, the method may include the following.

At block 50, a background part of the first scene image other than the portrait region is determined.

At block 60, the first scene image is processed to improve a saturation of the background part.

Figure 16:
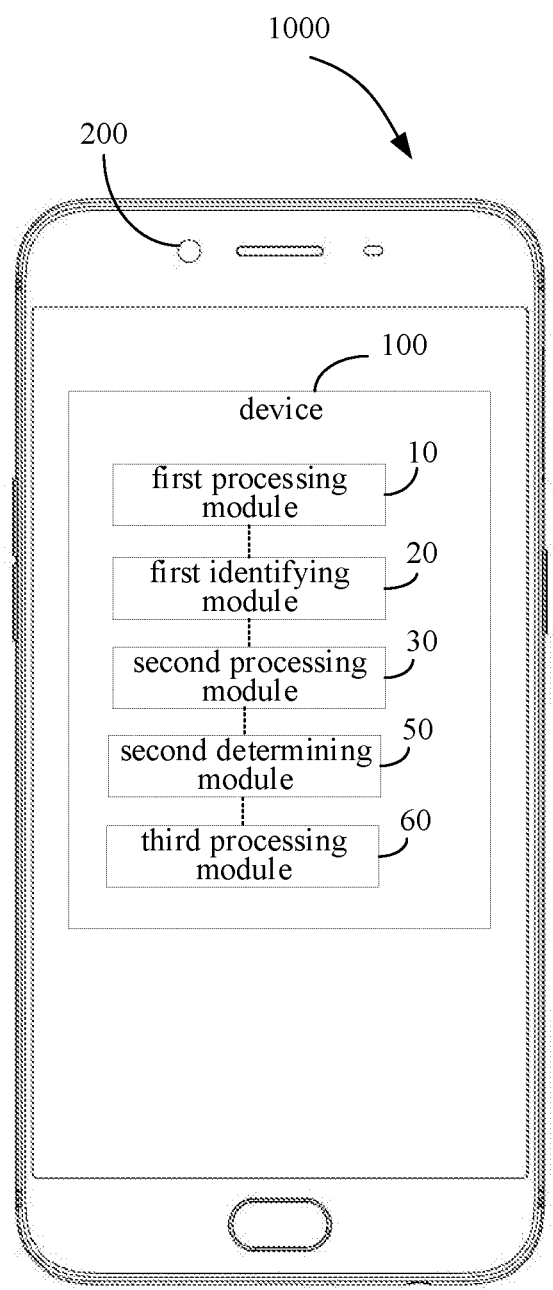
FIG. 16 is a block diagram illustrating functional modules of a processing device according to implementations of the present disclosure.

As illustrated in FIG. 16, in some implementations, the device 100 may further include a second determining module 50 and a third processing module 60. The block 50 may be implemented by the second determining module 50. The block 60 may be implemented by the third processing module 60. In other words, the second determining module 50 may be configured to determine the background part of the first scene image other than the portrait region. The third processing module 60 may be configured to process the first scene image to improve the saturation of the background part.

In detail, after the portrait region is determined, a remaining region of the first scene image may be determined as the background part. The background part should be understood broadly, indicating all other regions than the portrait region, rather than indicating a region having depth information larger than that of the portrait region. It may be understood that, improving the saturation of the background part may provide bright colors of the background part. In addition, since the saturation of the portrait region is decreased, the skin color of the portrait region may be normal.

Figure 17:
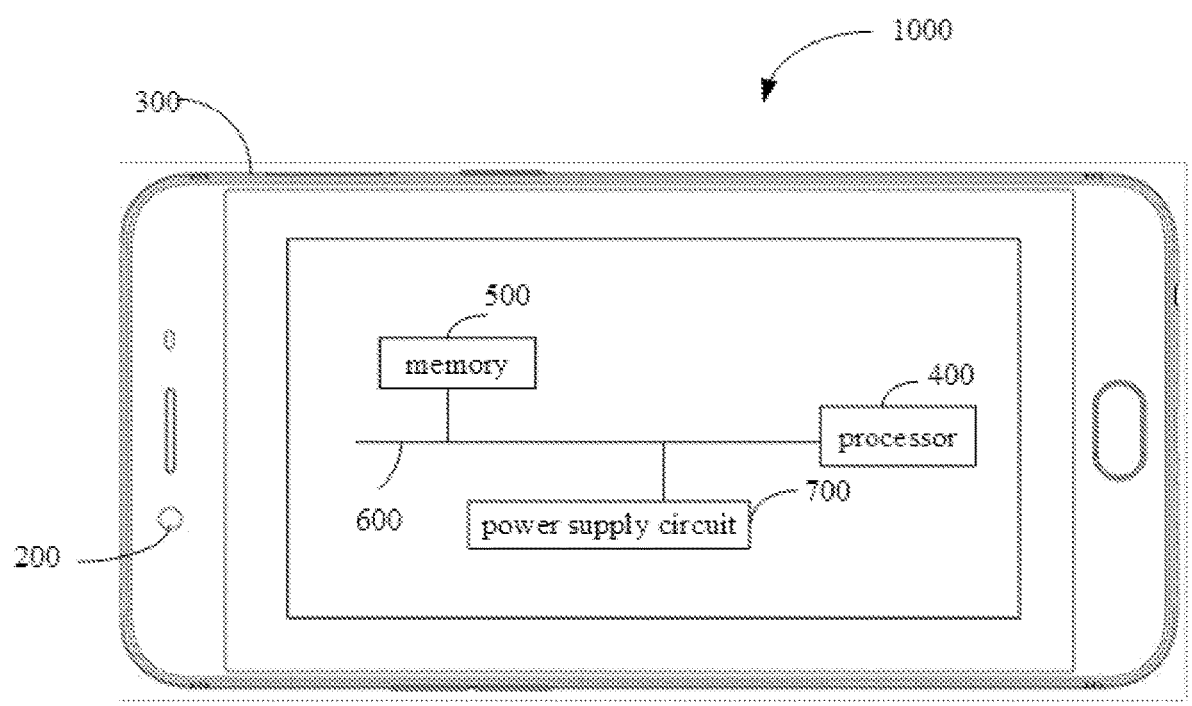
FIG. 17 is a block diagram illustrating functional modules of an electronic device according to implementations of the present disclosure.

As illustrated in FIG. 17, the electronic device 1000 according to implementations of the present disclosure may include a housing 300, a processor 400, a memory 500, a circuit board 600 and a power supply circuit 700. The circuit board 600 may be arranged inside a space enclosed by the housing 300. The processor 400 and the memory 500 may be disposed on the circuit board 600. The power supply circuit 700 may be configured to provide power for individual circuit or component of the electronic device 1000. The memory 500 may be configured to store an executable program code. The processor 400, by reading the executable program code stored in the memory 500, may be configured to run a program corresponding to executable the program code to execute a method for processing a saturation of an image according to any one of implementations of the present disclosure. While the first scene image is processed, the processor 400 may be configured to execute the following.

A first scene image is processed to determine whether a portrait exists in a scene. In response to determining that the portrait exists, the scene data is processed to identify a portrait region. The first scene image is processed to reduce a saturation of the portrait region.

It should be noted that, explanations and descriptions made to the method and the device 100 may be also applicable to the electronic device 10000 according to implementations of the present disclosure, which is not described herein.

Implementations of the present disclosure provide a computer readable storage medium, having instructions stored thereon. When the instructions are executed by the processor 400 of the electronic device 1000, the electronic device 1000 may be configured to execute the method according to implementations of the present disclosure. Explanations and descriptions made to the electronic device 1000 may be also applicable to the computer readable storage medium according to implementations of the present disclosure, which is not described herein.

In conclusion, with the electronic device 1000 and the computer readable storage medium according to implementations of the present disclosure, the portrait region may be identified when the portrait region exists in an image of the scene photographed. The saturation of the portrait region may be reduced. By separately processing the saturation of the portrait region to reduce the saturation of the portrait region, the color representation of the portrait region may be good and a display effect of the image may be good.

In descriptions of implementations of the present disclosure, terms of "first" and "second" are only used for description and cannot be seen as indicating or implying relative importance or indicating or implying the number of the indicated technical features. Thus, the features defined with "first" and "second" may comprise or imply one or more these features. In the description of the present disclosure, "a plurality of" means two or more than two, unless specified otherwise.

In descriptions of implementations of the present disclosure, it should be noted that, unless specified or limited otherwise, the terms "mounted," "connected," "coupled," "fixed" and the like are used broadly, and may be, for example, fixed connections, detachable connections, or integral connections; may also be mechanical or electrical connections, or may communicate with each other; may also be direct connections or indirect connections via intervening structures; may also be inner communications of two elements or interactions of two elements, which can be understood by those skilled in the art according to specific situations.

In descriptions of implementations of the present disclosure, reference throughout this specification to "an embodiment," "some embodiments," "an example," "a specific example," or "some examples," means that a particular feature, structure, material, or characteristic described in connection with the implementations or example is included in at least one implementation or example of the present disclosure. In this specification, exemplary descriptions of aforesaid terms are not necessarily referring to the same implementation or example. Furthermore, features, structures, materials, or characteristics may be combined in any suitable manner in one or more implementations or examples.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, wherein the order of execution may differ from that which is depicted or discussed, including according to involved function, executing concurrently or with partial concurrence or in the contrary order to perform the function, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of acquiring the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples (a non-exhaustive list) of the computer-readable medium comprise but are not limited to: an electronic connection (an electronic device) with one or more wires, a portable computer enclosure (a magnetic device), a random access memory (RAM), a read-only memory (ROM), an erasable programmable read-only memory (EPROM or a flash memory), an optical fiber device and a portable compact disk read-only memory (CDROM). In addition, the computer-readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method for the present disclosure may be achieved by commanding the related hardware with programs, the programs may be stored in a computer-readable storage medium, and the programs comprise one or a combination of the steps in the method embodiments of the present disclosure when running on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer-readable storage medium.

The storage medium mentioned above may be read-only memories, magnetic disks, CD, etc.

Although embodiments of present disclosure have been shown and described above, it should be understood that above embodiments are just explanatory, and cannot be construed to limit the present disclosure, for those skilled in the art, changes, modifications, alternatives, and variants can be made to the embodiments by those skilled in the art within the scope of the present disclosure.

What is claimed is:

1. A method for processing an image saturation based on depth of field, configured to process scene data collected by an imaging device, the scene data comprising a first scene image, and the method comprising:
    processing the scene data to determine whether a portrait exists in a scene;
    in response to determining that the portrait exists, determining a face region;
    determining an estimated portrait region based on a gesture of the portrait;
    determining a depth range of a portrait region based on depth information of the face region;
    determining a calculated portrait region adjacent to the face region and having a depth within the depth range based on the depth range of the portrait region;
    determining the calculated portrait region matching the estimated portrait region as the portrait region; and
    processing the first scene image to reduce a saturation of the portrait region.

2. The method of claim 1, wherein processing the scene data to determine whether the portrait exists in the scene comprises:
    processing the first scene image to determine whether a face exists; and
    in response to determining that the face exists, determining that the portrait exists in the scene.

3. The method of claim 1, further comprising:
    processing the first scene image to obtain the face region;
    processing the scene data to obtain depth information of the face region; and
    determining the portrait region based on the face region and the depth information.

4. The method of claim 3, wherein the scene data comprises a depth map corresponding to the first scene image, and processing the scene data to obtain the depth information of the face region comprises:
    processing the depth map to obtain the depth information of the face region.

5. The method of claim 3, wherein the scene data comprises a second scene image corresponding to the first scene image, and processing the scene data to obtain the depth information of the face region comprises:
    processing the first scene image and the second scene image to obtain the depth information of the face region.

6. The method of claim 3, further comprising:
    determining a limb region based on the portrait region;
    wherein processing the first scene image to reduce the saturation of the portrait region comprises:
    processing the first scene image to reduce at least one of a saturation of the face region or a saturation of the limb region.

7. The method of claim 6, wherein the limb region comprises a neck region, a hand region, a hip region, a leg region and/or a foot region, and a color of the limb region is similar to a color of the face region.

8. The method of claim 1, further comprising:
    determining a background part of the first scene image other than the portrait region; and
    processing the first scene image to increase a saturation of the background part.

9. An electronic device, comprising:
    a processor, and
    a memory, having an executable program code stored thereon,
    wherein the processor is configured, by reading the executable program code stored in the memory, to:
    process scene data to determine whether a portrait exists in a scene, the scene data comprising a first scene image;
    in response to determining that the portrait exists, determine a face region;
    determine an estimated portrait region based on a gesture of the portrait;
    determine a depth range of a portrait region based on depth information of the face region;
    determine a calculated portrait region adjacent to the face region and having a depth within the depth range based on the depth range of the portrait region;
    determine the calculated portrait region matching the estimated portrait region as the portrait region; and process the first scene image to reduce a saturation of the portrait region.

10. The electronic device of claim 9, wherein the processor is configured to process the scene data to determine whether the portrait exists in the scene by:
   processing the first scene image to determine whether a face exists; and
   in response to determining that the face exists, determining that the portrait exists in the scene.

11. The electronic device of claim 9, wherein the processor is further configured to:
   process the first scene image to obtain the face region;
   process the scene data to obtain depth information of the face region; and
   determine the portrait region based on the face region and the depth information.

12. The electronic device of claim 11, wherein the scene data comprises a depth map corresponding to the first scene image, and the processor is configured to process the scene data to obtain the depth information of the face region by:
   processing the depth map to obtain the depth information of the face region.

13. The electronic device of claim 11, wherein the scene data comprises a second scene image corresponding to the first scene image, and the processor is configured to process the scene data to obtain the depth information of the face region by:
   processing the first scene image and the second scene image to obtain the depth information of the face region.

14. The electronic device of claim 13, further comprising a first camera configured to capture the first scene image and a second camera configured to capture the second scene image, the first camera and the second camera being arranged adjacent to each other.

15. The electronic device of claim 11, wherein,
   the processor is further configured to determine a limb region based on the portrait region; and
   the processor is configured to process the first scene image to reduce the saturation of the portrait region by processing the first scene image to reduce at least one of a saturation of the face region or a saturation of the limb region.

16. The electronic device of claim 15, wherein the limb region comprises a neck region, a hand region, a hip region, a leg region and/or a foot region, and a color of the limb region is similar to a color of the face region.

17. The electronic device of claim 9, wherein the processor is further configured to:
   determine a background part of the first scene image other than the portrait region; and
   process the first scene image to increase a saturation of the background part.

18. A non-transitory computer readable storage medium, having an instruction stored thereon, wherein when the instruction is executed by a processor of an electronic device, the electronic device is configured to execute a method for processing an image saturation based on depth of field, the method comprising:
   processing scene data to determine whether a portrait exists in a scene, the scene data comprising a first scene image;
   in response to determining that the portrait exists, determining a face region;
   determining an estimated portrait region based on a gesture of the portrait;
   determining a depth range of a portrait region based on depth information of the face region;
   determining a calculated portrait region adjacent to the face region and having a depth within the depth range based on the depth range of the portrait region;
   determining the calculated portrait region matching the estimated portrait region as the portrait region; and
   processing the first scene image to reduce a saturation of the portrait region.

* * * * *